UNITED STATES PATENT OFFICE.

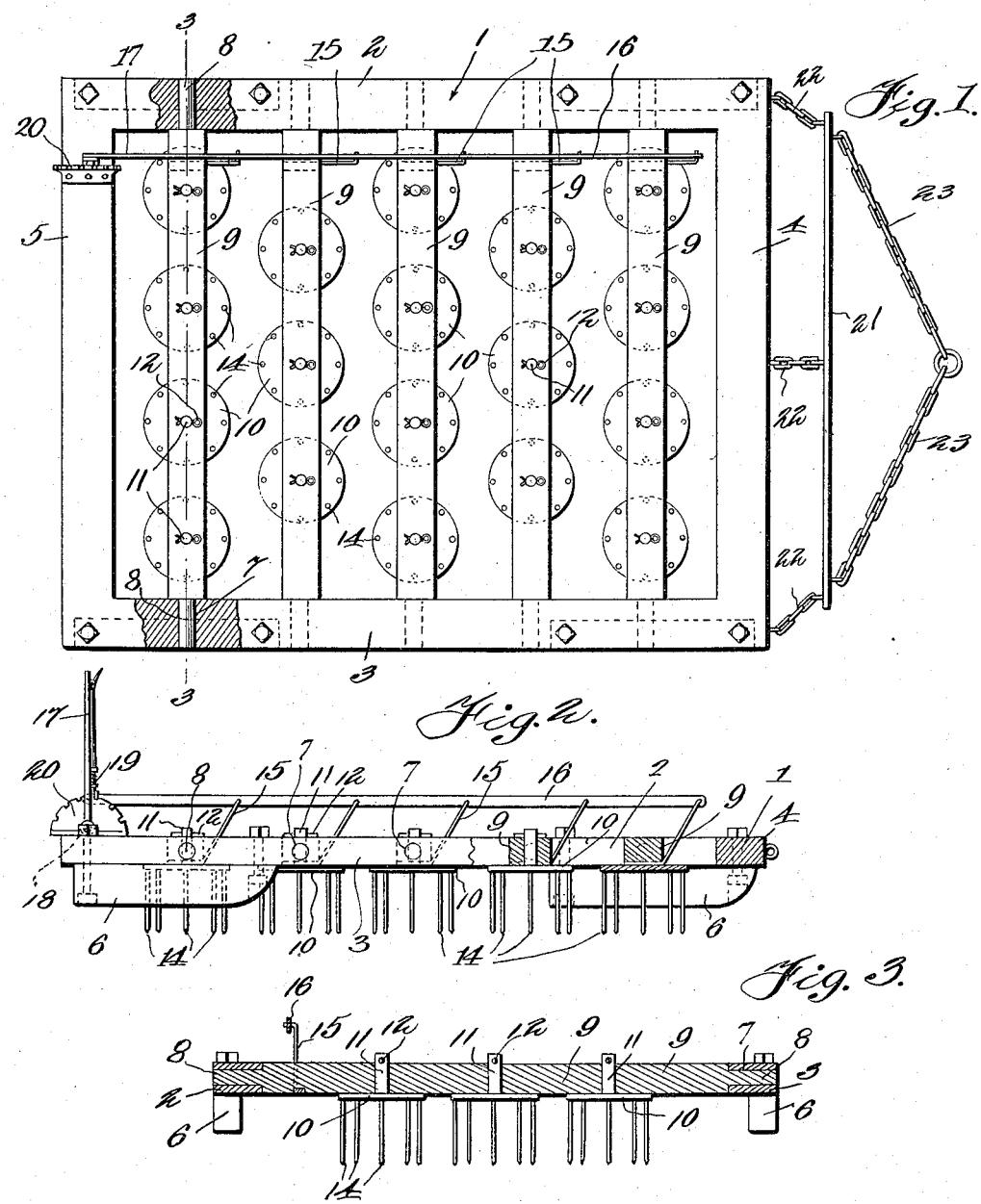

GEORGE W. STUBBLEFIELD, OF BAY CITY, OREGON.

HARROW.

1,165,213.  Specification of Letters Patent.  Patented Dec. 21, 1915.

Application filed June 16, 1915. Serial No. 34,444.

*To all whom it may concern:*

Be it known that I, GEORGE W. STUBBLEFIELD, a citizen of the United States, residing at Bay City, in the county of Tillamook, and State of Oregon, have invented certain new and useful Improvements in Harrows; and I do hereby declare the following to be a full, clear, and exact description of the invention, such as will enable others skilled in the art to which it appertains to make and use the same.

This invention relates to harrows, and the primary object of the invention is to provide a harrow, including a plurality of staggeredly arranged disks, which are rotatably supported by a supporting frame, and have a plurality of harrow teeth carried thereby, and further to provide means whereby the disks may be pulled into a vertical position for positioning the teeth horizontally and out of a harrowing position.

Another object of this invention is to provide runners or shoes which are attached to the under surface of the supporting structure for holding the same above the surface of the ground over which the harrow is traveling, when the teeth are in an inoperative or non-harrowing position.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a top plan view of the harrow, Fig. 2 is a side elevation of the harrow, showing parts broken away, and Fig. 3 is a cross sectional view of the harrow on the line 3—3 of Fig. 1.

Referring more particularly to the drawings, 1 designates the harrow supporting structure, as an entirety, which is composed of side bars 2 and 3, and cross or end bars 4 and 5. The side bars 2 and 3 have runners or shoes 6 secured to their under surfaces, adjacent their forward and rear ends, which shoes or runners are provided for supporting the supporting frame 1 above the surface of the ground over which they are always traveling, when the teeth are positioned in a non-harrowing position.

The side bars 2 and 3 have a plurality of openings 7 formed therein, in alining pairs, which rotatably receive the reduced ends 8 of cross bars 9. The cross bars 9 extend entirely across the supporting frame or structure 1, and they are spaced from each other, as clearly shown in Fig. 1 of the drawings. The cross bars 9 have a plurality of disks 10 rotatably secured thereto, by means of pins 11, which extend upwardly from the center of the disks 10, and are held in place by keys or cotter pins 12, which extend diametrically through the upper ends of the pins 11 and engage the upper surfaces of the cross bars 9.

The disks 10 have a plurality of harrowing teeth 14 secured thereto at spaced intervals a short distance inwardly from the periphery of the disks, which teeth extend downwardly, and are provided for crushing clods, and harrowing ground preparatory to planting seed in the same.

The cross bars 9 are rotatably carried by the side bars 2 and 3, and they have arms 15 secured thereto and extending upwardly, which arms are in turn connected to a rod 16. The rod 16 extends longitudinally of the supporting frame 1 and has its rear end connected to a lever 17. The lever 17 is pivotally connected at 18, to the supporting structure 1, and it has a dog mechanism 19 of the usual construction, carried thereby which co-acts with a quadrant 20, for holding the lever and consequently the bar 16 in various adjusted positions. The rocking movement of the lever 17, will move the rod 16 longitudinally, and rock the various cross bars 9, moving them so that the disks 10 will lie in a substantially vertical position, in lieu of the horizontal position which they assume when the harrow is in an operative position.

The front cross rail or end bar 4 has an evener bar 21 connected thereto by means of flexible members 22, and the evener bar in turn has flexible members 23 connected thereto, which are provided for hitching a draft tree to the harrow.

In reducing the invention to practice, certain minor features of construction, combination and arrangement of parts may necessitate alteration, to which the patentee is entitled, provided such alterations are comprehended within the scope of what is claimed.

What is claimed is:—

1. In a harrow structure, a substantially rectangular supporting frame having side bars, a plurality of cross bars rotatably carried by said side bars, disks rotatably carried by said cross bars, the disks carried by one of said cross bars being disposed staggeredly with respect to the disks carried by the cross bar next thereto, and a plurality of depending harrow teeth carried by said disks.

2. In a harrow structure, a supporting frame having side bars, a plurality of cross bars rotatably carried by said side bars, a plurality of disks rotatably and detachably carried by said cross bars, the disks carried by one of said cross bars being disposed staggeredly with respect to the disks carried by the cross bar next thereto, a plurality of depending harrow teeth carried by said disks, said disks normally lying in a horizontal plane when in an operative position, and means for rocking said cross bars for moving said disks into a substantially vertical plane for moving said harrowing teeth out of an operative position.

3. In a harrow structure, a supporting frame having side bars, a plurality of cross bars rotatably carried by said side bars at spaced intervals with respect to each other, a plurality of disks rotatably and detachably carried by said cross bars, the disks carried by one of said cross bars being disposed staggeredly with respect to the disks carried by the cross bar next thereto, a plurality of depending harrow teeth carried by said disks, arms secured to said cross bars, a rod connected to said arms, a lever operatively connected to said rod for moving said rod longitudinally for rotating said cross bars for positioning said disks in a substantially vertical plane.

4. In a harrow structure, a supporting frame having side bars, a plurality of cross bars rotatably carried by said side bars at spaced intervals with respect to each other, a plurality of disks rotatably and detachably carried by said cross bars, the disks carried by one of said cross bars being disposed staggeredly with respect to the disks carried by the cross bar next thereto, a plurality of depending harrow teeth carried by said disks, arms secured to said cross bars, a rod connected to said arms, a lever operatively connected to said rod for moving said rod longitudinally for rotating said cross bars for positioning said disks in a substantially vertical plane, and runners secured to the under surface of the forward and rear ends of said side bars.

In testimony whereof I affix my signature in presence of two witnesses.

GEORGE W. STUBBLEFIELD.

Witnesses:
T. B. STUBBLEFIELD,
T. E. ASHLEY.

Copies of this patent may be obtained for five cents each, by addressing the "Commissioner of Patents, Washington, D. C."